March 23, 1965   R. F. LEFTWICH   3,175,092
INFRARED RADIOMETERS WITH EXTERNAL CHOPPING AND ELIMINATION OF
CHOPPED RADIATION FROM INSTRUMENT WALLS AND COMPONENTS
Filed March 16, 1961

*INVENTOR.*
RICHARD F. LEFTWICH
BY
*ATTORNEY*

3,175,092
INFRARED RADIOMETERS WITH EXTERNAL CHOPPING AND ELIMINATION OF CHOPPED RADIATION FROM INSTRUMENT WALLS AND COMPONENTS
Richard F. Leftwich, Pound Ridge, N.Y., assignor to Barnes Engineering Company, Stamford, Conn., a corporation of Delaware
Filed Mar. 16, 1961, Ser. No. 96,122
6 Claims. (Cl. 250—233)

This invention relates to infrared radiometers and more particularly to infrared radiometers having high speed immersed thermistor bolometers as detectors.

Infrared radiometers of high precision present problems. They are normally used with choppers or other means for periodically interrupting the radiation in order to produce A.C. signals from the detectors. It is with this type of radiometer that the present invention deals.

Most radiometers in the infrared produce outputs in which the signals from incoming radiation are compared against signals from a reference source. Ordinarily the chopping means alternately illuminates the detector with one or the other radiations. The electronic processing circuits include an A.C. amplifier or preamplifier which does not respond to D.C. signals. The radiometers of the present invention use the same standard A.C. electronic processing circuits and it is an advantage of the present invention that no new electronics are needed. Accordingly throughout the present specification there will be no description or reference of any particular electronic circuits since their details form no part of the present invention except, of course, that they respond only to alternating current signals. Another way of looking at the present invention is that the novelty of the invention ceases once the signal has been produced by the detector. From then on all the elements of the radiometer are standard.

Infrared radiometers suffer from the phenomenon that everything at a temperature above absolute zero radiates in the infrared. In ordinary radiometers using chopped radiation if the detector sees anything of the walls of the radiometer the signal from such radiation appears as a spurious signal and may seriously affect the accuracy and/or reliability of the instrument.

It has been proposed in the past to mount the infrared detector in the bottom of a conical black body cavity maintained at a predetermined reference temperature. One of the most modern and effective variants of this type of mounting is described and claimed in the copending patent of Wormser, De Waard and Rudomanski, No. 3,097,300, July 9, 1963. Here a mirror chopper forms a part of the wall of the reference cavity and with ordinary thermistor detectors constitutes a reasonably sufficient solution of the problem. However, there is a dependence on a narrow field of view of the detector and when immersed thermistors are used the problem of spurious radiation from the instrument walls becomes more serious.

The present invention depends on a new and unusual arrangement of optics and radiation chopping means which completely eliminates problems of instrument wall radiation and reduces to an extremely small minimum any signal from the detector that is not produced by target radiations. It is another advantage of the present invention that there is no limitation on the nature of the detector and highly efficient immersed thermistor bolometers may be used.

Essentially the present invention reverses the usual organization of optics and chopper. Instead of first collecting the radiation and then chopping it between collecting optics and detector the radiation is chopped before it enters the optical system at all. As a result, except for a small portion of the chopping mechanism itself, there is no interrupted radiation from any part of the instrument striking the detector. Accordingly it makes no difference whether the instrument walls are hot or cold, of uniform temperature or nonuniform temperature. Radiation is simply not chopped at all and no A.C. signal is produced by the detector and so there is no response in the conventional A.C. processing circuits. Spurious response elimination is complete and no care need be taken what temperature the instrument walls may be. The elimination of instrument wall signals is so complete that even if a blow torch were applied to the instrument wall to produce a spot many hundreds of degrees hotter no interfering signal would result.

Because chopping takes place before radiation enters the optics a particular kind of chopper is required. The rotating portion which may, but need not be, mirrored preferably rotates about an axis on the optical axis of the instrument on which the detector is also mounted. In back of the chopper is a second mask with open and mirrored segments so that alternately radiation from the target enters the system or there is a complete mirror which reflects radiations from the detector back to itself.

Because the detector sees all of the rotating chopper all of the time any radiation from the chopper is not interrupted and so is also completely eliminated. The radiation from the blades of the stationary element is, however, interrupted. But this creates no serious problem as these stationary blades may be given a highly reflecting mirror surface, for example, polished gold, and so have negligible emission in the infrared. For example, even a 30° change in temperature of the chopping mechanism would correspond to less than a degree change in the temperature of a target. It has been stated above that as far as the instrument walls are concerned even ridiculous extremes of temperature produce no effect. It is not necessary to provide any elaborate insulation of the instrument but some care may be taken to prevent strong heating of the chopping mechanism. Otherwise the instrument is indifferent to environmental thermal condition and so constitutes a departure from the ordinary radiometers.

It is common in precision instruments that when one factor is eliminated there are many offsetting disadvantages. In the present case, except for a slight decrease in light, it is possible to use optics which are at least as fast as were used in the past and lend themselves to even greater precision of imaging. It is also an advantage of the present invention that none of the elements of the optics are difficult to produce and some are standard available items. For example it is not necessary to mirror the light weight rotating chopper. The present invention deals, of course, with a scientific instrument of great accuracy and so the customary care in manufacture should be taken which is necessary in any precision instrument. There are, however, no critical controls peculiar to the present invention.

The invention will be described in greater detail in conjunction with the drawings in which.

Figure 1:
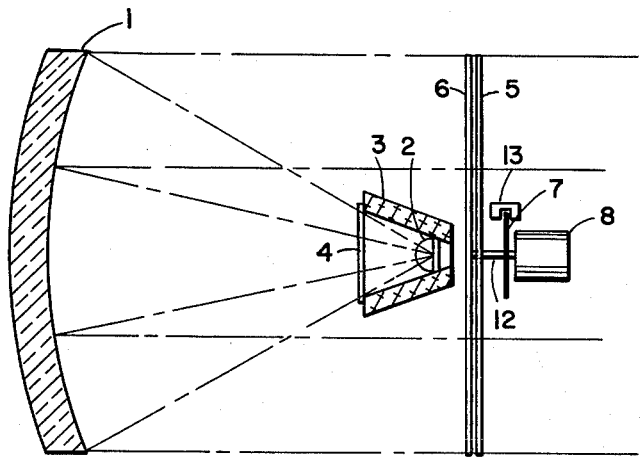
FIG. 1 is a semidiagrammatic section through the instrument.
Figure 2:
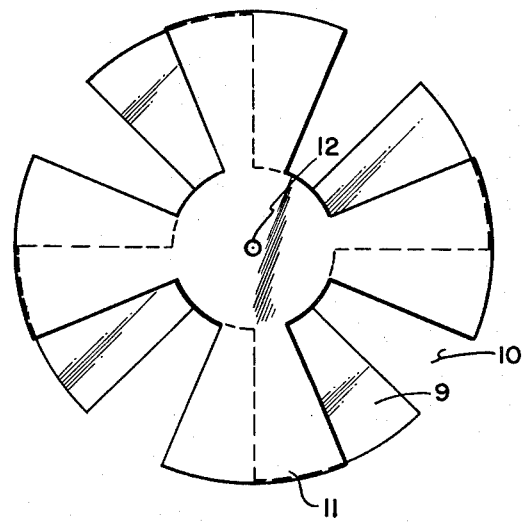
FIG. 2 is an elevation of a chopping mechanism.

FIG. 1 shows an extremely simple form of collecting optics namely an ordinary large paraboloid mirror 1. The mirror focuses light from distant objects onto an immersed thermistor bolometer 2, the immersion lens being of material of suitable light transmission for the radiation used, for example germanium in the longer wave infrared. The bolometer is mounted at the bottom of a conical black body cavity 3 provided with the customary means for maintaining it at a predetermined temperature. A filter 4 is snapped across the opening of the black body cavity where it is desired to restrict the instrument to a particular band of radiation.

Radiation coming in passes first through a stationary mask 5 provided with mirror segments 9 and open segments 10. Closely adjacent the mask 5 is a rotating chopper 6 provided with a series of blades 11. Rotation is by means of a motor 8 through a shaft 12 on which is also mounted a disc 7 which actuates a synchronous signal generator 13 of the conventional magnetic type.

As the disc 6 rotates its blades 11 alternately pass radiation through the openings 10 of the mask 5 and obscure them. The detector, therefore, sees a chopped or pulsing radiation coming through the open segments and collected by the mirror 1. The blades of the rotating section 6 of the chopper are seen at all times and therefore their infrared emission is no more important than that of the walls of the instrument.

It will be seen that except for the radiation coming through or from the mask 5 any radiation emitted on the walls of the instrument or from the collecting mirror 1 is unchopped and therefore is not seen by the detector and its associated A.C. circuits. The blades 9 of the stationary mask 5 however are periodically obscured by the rotating chopper and therefore any radiation emitted therefrom is chopped radiation. For this reason they are given an excellent mirror surface of gold and introduce a negligible amount of chopped signal.

A filter 4 has been shown but if it is not desired to exclude any particular wavelength band the filter may, of course, be omitted or if it is desired to change the bandwidth to be observed a different filter can easily be snapped on to the black body. Once the filter has been snapped on, particularly if it is a rather thin and light filter, it rapidly assumes the temperature of the black body cavity 3 and in any event any self-emission from it is not chopped and so does not affect the signal from the detector.

A stationary mask 5 has been shown and for most instruments this presents structural advantages. However, of course, it is perfectly possible to have both 5 and 6 rotating, for example in opposite directions. The operation is the same but as the additional complexity does not improve results it is not preferred.

A simple catoptric system of collecting optics has been shown and this has many practical advantages. However, of course, any other system such as a plane mirror and lens may be used. In each case any infrared emitted by the element is not chopped and so their temperature is immaterial.

I claim:

1. An infrared radiometer comprising in optical alignment and in a unitary structure,
    (a) a radiation detector,
    (b) collecting optics adapted to receive radiation from a desired target and chopping means for said radiation before it enters the collecting optics, said chopping means comprising an aperture mask and a rotatable chopper,
    (c) the element of the chopping means through which the radiation first passes being provided with mirrored surfaces directed toward the detector, and
    (d) the chopping means being symmetrically and continuously in the field of view of the radiation detector.

2. An infrared radiometer according to claim 1 in which the collecting optics in the direction of radiation passage therethrough consists of a stationary mask having openings, the mask having a mirrored surface toward the detector followed by a rotating chopper the chopping means and the detector being located on the optic axis of the instrument and the mask and rotating chopper extending in planes at right angles to the optic axis.

3. A radiometer according to claim 2 in which the radiation detector is an immersed thermistor bolometer.

4. A radiometer according to claim 2 in which the radiation detector is mounted in the bottom of a conical reference black body source and the collecting optics is a paraboloidal mirror.

5. A radiometer according to claim 4 in which the blades of the rotating chopper have mirrored surfaces on their sides toward the paraboloidal mirror.

6. A radiometer according to claim 1 in which the radiation detector is an immersed thermistor bolometer.

References Cited by the Examiner
UNITED STATES PATENTS

| | | |
|---|---|---|
| 1,791,938 | 2/31 | Schroeter et al. |
| 2,237,193 | 4/41 | Mobsby. |
| 2,674,155 | 4/54 | Gibson _____ 250—233 X |
| 2,818,775 | 1/58 | Ullrich _____ 250—233 X |
| 2,879,401 | 3/59 | Chicurel. |
| 2,897,369 | 7/59 | Ketchledge. |
| 2,951,658 | 9/60 | Jones et al. |
| 2,964,629 | 12/60 | Wiener. |
| 2,978,589 | 4/61 | Howell _____ 250—233 |
| 2,982,856 | 5/61 | Comp. |
| 3,003,026 | 10/61 | Astheimer. |
| 3,003,064 | 10/61 | Astheimer. |
| 3,039,006 | 6/62 | Weiss _____ 250—233 |
| 3,054,899 | 9/62 | McKnight et al. |
| 3,073,957 | 1/63 | Jones. |

FOREIGN PATENTS 1,199,536   6/59   France.

RALPH NILSON, *Primary Examiner.*

ARCHIE R. BORCHELT, *Examiner.*